United States Patent [19]
Lauffer et al.

[11] Patent Number: 5,215,468
[45] Date of Patent: Jun. 1, 1993

[54] METHOD AND APPARATUS FOR INTRODUCING SUBLIMINAL CHANGES TO AUDIO STIMULI

[76] Inventors: Martha A. Lauffer; Donald K. Lauffer, both of 18363 Hampshire La., San Diego, Calif. 92128

[21] Appl. No.: 667,490
[22] Filed: Mar. 11, 1991
[51] Int. Cl.⁵ .......................... G09B 19/00; G09B 5/04
[52] U.S. Cl. ..................... 434/236; 434/319; 482/3; 482/148
[58] Field of Search ............... 434/307, 319, 236, 179, 434/178; 360/74, 72, 73.8, 73.01, 73.08, 73.06; 84/484, 612, 636, 652, 668, 714; 369/189

[56] References Cited

U.S. PATENT DOCUMENTS

| | | | |
|---|---|---|---|
| 3,231,282 | 1/1966 | Dennis | 369/189 |
| 3,695,553 | 10/1972 | Everett | 360/134 X |
| 4,296,446 | 10/1981 | Zorbalas | 360/73.08 |
| 5,033,966 | 7/1991 | Behunin | 434/178 |
| 5,103,348 | 4/1992 | Sasho et al. | 360/73.08 X |

Primary Examiner—Richard J. Apley
Assistant Examiner—John Pleubecker
Attorney, Agent, or Firm—Gregory P. Gadson

[57] ABSTRACT

A method and apparatus for introducing gradual changes to an audio signal so that the changes are subliminal. The changes can involve tempo and volume, for example, and can take the form of a gentle gradient having ever increasing/decreasing ramp-like changes over a sufficient duration, or a more complex program involving several gentle gradients. In the preferred embodiment, an enhanced audio play-back device such as a portable audio cassette recorder can be programmed to subliminally alter the characteristics of a standard pre-recorded tape containing music, for example. As a motivational tool during walking, jogging or other repetitive exercise, the tempo is gradually increased over a period of time to encourage a corresponding gradual (and subliminal) increase in physical exertion by a user whose rate of movement is proportional to the tempo of the music. The tempo can be either manually changed in conjunction with a subliminal program, or by itself in an override mode, or by itself in a version of the present-inventive audio play-back device which allows only manual tempo alternation. In an alternate embodiment, a special pre-recorded tape contains subliminal changes in tempo, for example, for play-back on a standard audio cassette recorder (which operates at one speed, only) to cause the same effect as the preferred embodiment.

22 Claims, 5 Drawing Sheets

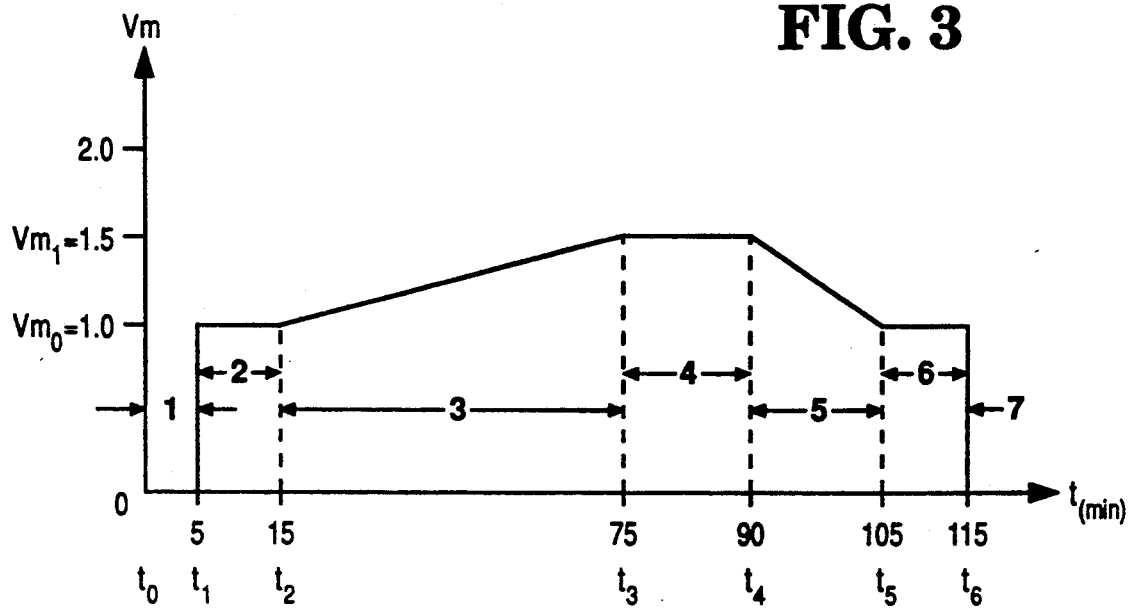
FIG. 3
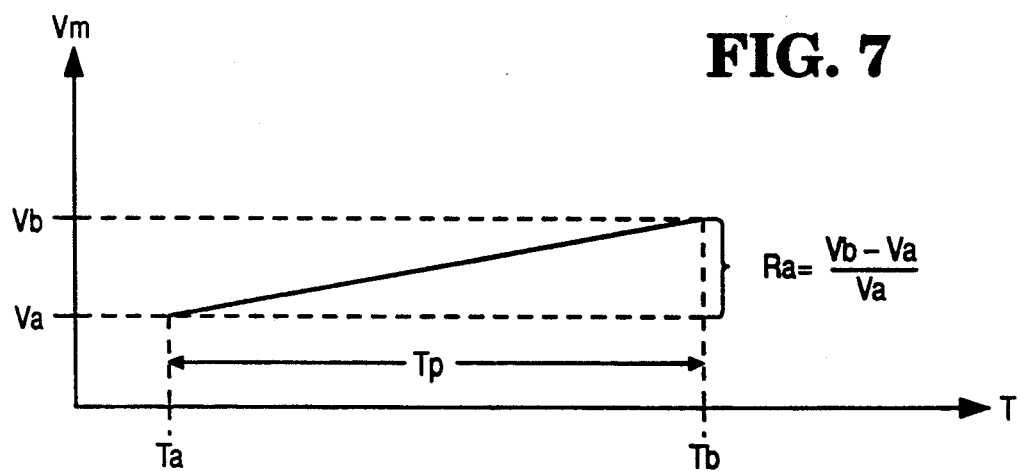
FIG. 7
FIG. 6A
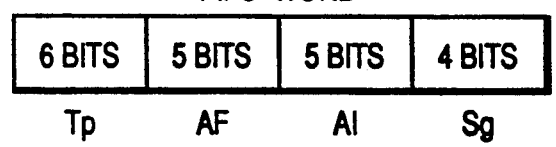
FIG. 6B

METHOD AND APPARATUS FOR INTRODUCING SUBLIMINAL CHANGES TO AUDIO STIMULI

BACKGROUND OF THE INVENTION

The present invention relates broadly to both exercise motivation tools and to audio signal reproduction devices.

Exercise has become an important activity to many people, in part because of the publicized benefits such as cardio-vascular, weight control, muscle tone and others. For an average person, it is desirable to reach a target heart rate for a recommended period of time during an exercise routine. Athletes may wish to train beyond the average target heart rate.

Repetitive exercise such as walking, jogging and biking have been shown to be excellent aerobic activities for meeting both target heart rates and training goals. Unfortunately, these activities, when prolonged, are sometimes associated with a degree of boredom. Additionally, the rate of activity needed to reach and maintain target heart rates and training goals is intimidating for some.

Music has long been used to help exercisers pass time during their workouts, and to create a more pleasant environment. The use of music while exercising has become increasingly popular in recent years with the availability of portable audio devices such as audio cassette players which are the product of micro-miniaturization. What is needed—but lacking in the prior art—is an efficient way of combining the use of music or other audio stimuli with exercise to motivate exercisers to a higher level of performance with little or no recognition of the transition between the lower and higher levels. This would greatly said in reducing the aforementioned boredom and intimidation sometimes associated with exercise.

SUMMARY OF THE INVENTION

The following are objects of the present invention in view of the above.

A first object of the present invention is to provide a method and apparatus for, during physical activity, motivating a user to change the rate of his or her physical activity while receiving subliminally changing audio stimuli, the physical activity being synchronized to the audio stimuli.

A second object of the present invention is to provide a method and apparatus for, during physical activity, motivating a user to change the intensity of his or her physical activity while receiving subliminally changing audio stimuli, the physical activity being synchronized to the audio stimuli.

A third object of the present invention is to satisfy the first and second objects of the present invention by use of a specially modified audio play-back device in conjunction with a standard pre-recorded audio storage device.

A fourth object of the present invention is to satisfy the first and second objects of the present invention by use of a standard audio play-back device in conjunction with a specially recorded audio storage device having subliminal variations.

A fifth object of the present invention is to satisfy the first through third objects of the present invention by allowing the user to program the subliminal changes to the audio stimuli.

A sixth object of the present invention is to satisfy the fifth object of the present invention by programming the subliminal changes to the audio stimuli via a pluggable module used to modify a standard, but compatible audio play-back device, so that the audio play-back device functions in a conventional manner when the module is unplugged.

A seventh object of the present invention is to satisfy the first through sixth objects of the present invention using audio stimuli primarily of a musical nature.

An eighth object of the present invention is to satisfy the first through sixth objects of the present invention using audio stimuli primarily of a cadence nature.

A ninth object of the present invention is to satisfy the first through third and fifth through eighth objects of the present invention with the ability to create and store complex programs.

A tenth object of the present invention is to satisfy the first through ninth objects of the present invention using any type of audio play-back device—for example, tape player, compact disk player, radio, etc.—whether or not "portable".

There is provided, in accordance with the present invention, an audio signal reproduction apparatus for producing an output aural signal related to an input audio signal which includes: receiver means for receiving the input audio signal and outputting a receiver output signal which is a version of the input audio signal with altered identifiable characteristics; transducer means connected to the receiving means for converting the receiver output signal into and output aural signal; and control means connected to the receiver means for programmably controlling, via control signals input by a user, at least a gradual alteration of the input audio signal over at least a portion of the duration of the input audio signal so that the alteration is subliminal.

There is also provided, in accordance with the present invention, an audio signal reproduction method for producing an output aural signal related to an input audio signal which includes the steps of: receiving the input audio signal and outputting a receiver output signal which is a version of the input audio signal with altered identifiable characteristics; converting the receiver output signal into and output aural signal; and programmably controlling, via control signals input by a user, at least a gradual alteration of the input audio signal over at least a portion of the duration of the input audio signal so that the alteration is subliminal.

There is further provided, in accordance with the present invention, a pre-recorded audio signal storage device which includes storage means for storing an input audio signal having identifiable characteristics, wherein at least one identifiable characteristic is gradually altered over at least a portion of the duration of the input signal so that the alteration is subliminal.

The details of the present invention will be revealed in the following description with reference to the attached drawings.

BRIEF DESCRIPTION OF THE DRAWINGS

FIG. 3 is a sample graph of the voltage output of the tempo control unit of the present invention.

FIG. 6a is a diagram of the "FIFO" words of the present invention.

FIG. 6b is a diagram of the "CONTROL" words of the present invention.

FIG. 7 is a graph of a representative ramp voltage utilized in the present invention.

DETAILED DESCRIPTION OF THE INVENTION

Preferred Embodiment

Figure 1:
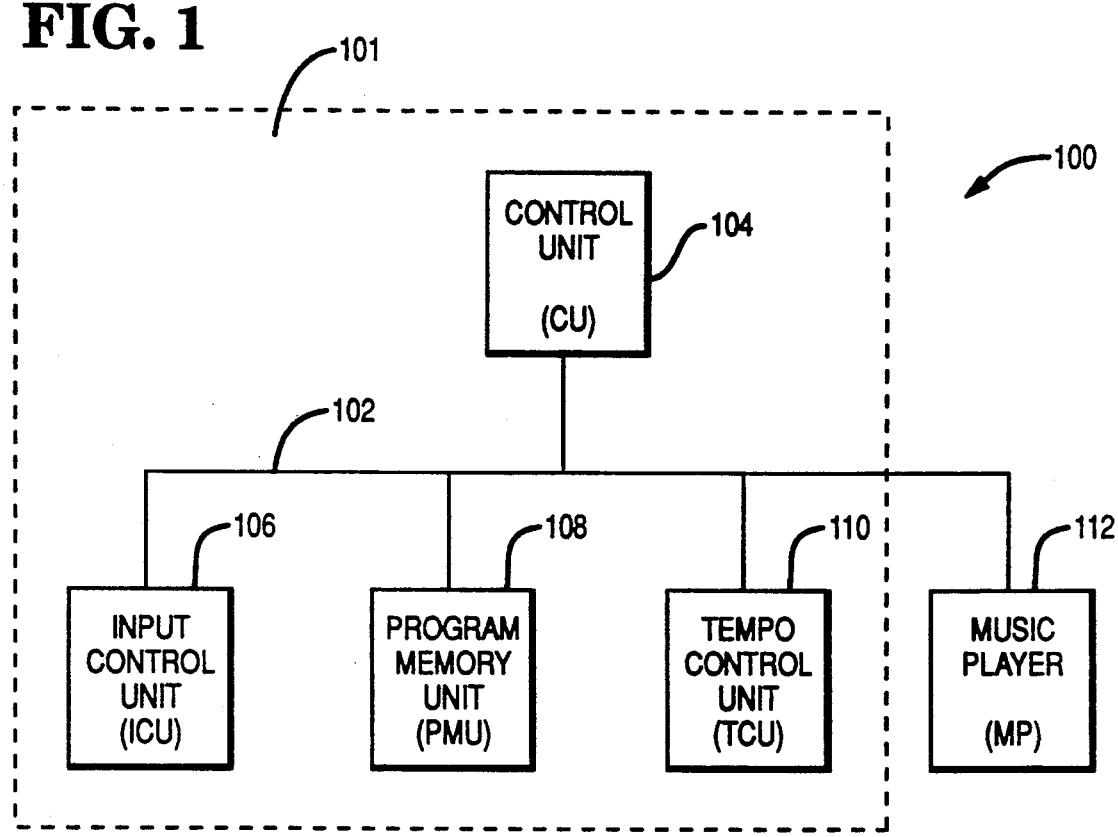
FIG. 1 is a schematic block diagram of the audio motivation apparatus of the present invention.

Since the invention resides primarily in the novel structure combination and the method of operation of well-known circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of this invention have been appropriately consolidated and simplified to stress those aspects most pertinent.

The audio motivation apparatus labeled 100 in FIG. 1 is an apparatus capable of carrying out the objects of the present invention. It is capable of audio/aural reproduction with tempo or volume changes which are so gradual over a time period or time periods that they are subliminal in nature. While linear subliminal changes are described below, curvilinear subliminal changes are also possible. The audio motivation apparatus 100 is a combination of a special subliminal control apparatus 101 and a prior art audio play-back device 112, and may be constructed as one physical unit, or the subliminal control apparatus 101 may be in the form of a removal module which when not connected to the audio play-back apparatus, allows the the audio play-back device to function in a typical prior art fashion. The audio play-back device can be almost any device capable of reproducing recordings, including but not limited to, tape (analog and digital) players, compact disk (CD) players, phonograph record players, recording organs, music boxes and radios, or those employing non-movable media devices such as random access memories (RAMs), read only memories (ROMs) or programmable read only memories (PROMs), for audio signal storage. The user may conveniently change an audio program or library of audio programs by inserting/engaging the appropriate storage device.

Music of all types can be used, although band or orchestra music has some advantages for some forms of physical activity. Additionally, the audio stimuli can be in the form of rhythmic notes or beats (cadence indicia) to which the user may synchronize his or her movements. The beats may be pre-recorded, or they may be isolated from music using prior art filtering techniques by slightly modifying the present circuit. Whether analog or digital (such as ROMs), the audio signal can take on many forms, such as a standard medically prescribed program, a standard physical exercise program, or one which establishes safety limits for an individual user.

The audio motivation apparatus 100 includes a control unit (CU) 104, an input control unit (ICU) 106, a program memory unit (PMU) 108, a tempo control unit (TCU) 110 and the previously mentioned audio playback device or music player (MP) 112. The CU 104 controls the overall operation of the apparatus 100 by providing control and timing signals to the other components of the subliminal control apparatus 101. The ICU 106 contains a series of electronic switches accessible by the user to program the subliminal control apparatus 101. The PMU 108 can store several separate programs created by the user for introducing subliminal changes to the audio stimuli produced by the MP 112 during an exercise routine or routines. In response to a stored program, the TCU 110 outputs all of the control voltages needed to control and subliminally alter the output audio signal.

Figure 2:
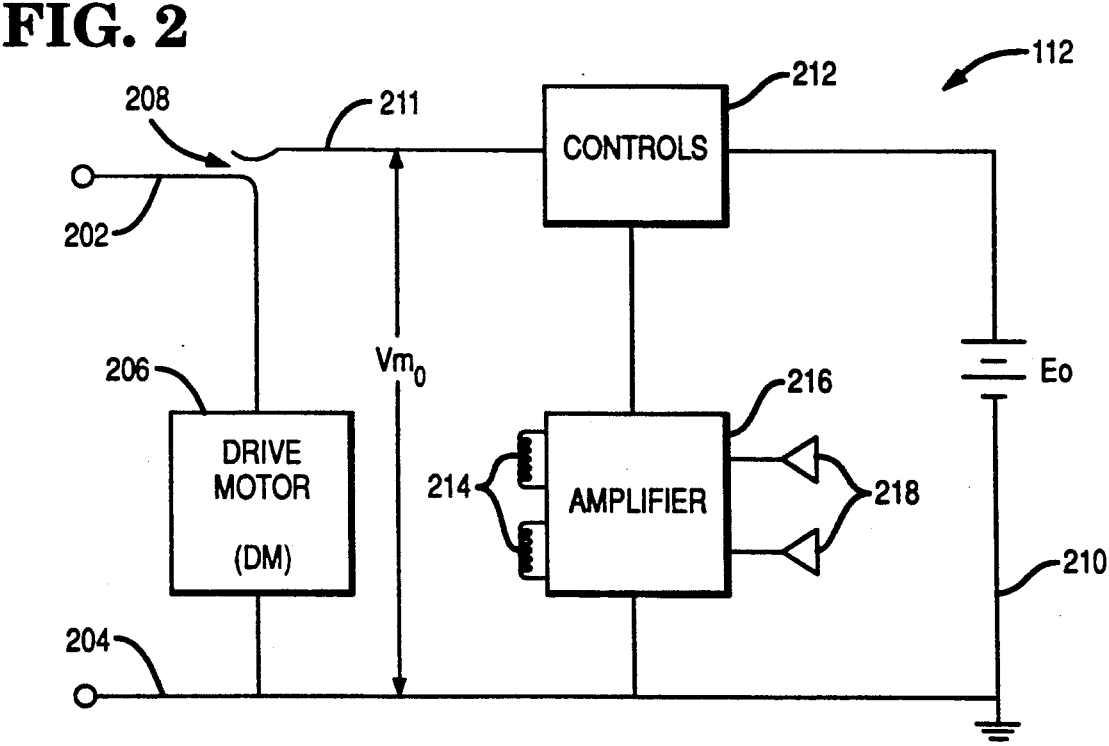
FIG. 2 is a partial schematic block diagram of a prior art audio play-back device.

A brief description of the MP 112 (of the tape variety) shown in FIG. 2 will now be given. A tape containing the audio signal (not shown) is driven past magnetic tape heads 214 by a drive motor (DM) 206 at a normal constant speed when connected to a power source Eo via lines 210 and 211. The DM 206 or driver means includes a motor and appropriate mechanical gears, as is well known in the art. The drive speed is varied by changing the motor speed and/or by changing a gearing ratio. The signal output by the tape heads 214 is amplified by an amplifier 216. The amplified signal is converted to an aural (audible) signal by speakers or transducers 218. Various controls 212 represent "play", "stop", "fast forward" and "reverse" modes of the MP 112. The modes are determined by the level and sign of the voltage placed upon the DM 206 in relation to the voltage of the power source Eo. If Vmo is the voltage drop across the DM 206 for the normal "play" mode (where Vmo<Eo), a voltage greater than Vmo is associated with the "fast forward" mode, and a negative voltage is associated with the "reverse" mode, for example.

The prior art MP 112 is modified in accordance with the present invention by introducing two control voltage input lines 202 and 204 to control the voltage across the DM 206, and by activating a disconnect switch 208 to sever a direct connection between the DM 206 and the controls 212 when the subliminal control apparatus 101 is operational. However, use of the controls 212 overrides the inputs 202 and 204. The DM 206 and hence the resulting output audio signal can be subliminally changed when desired by control of the voltage or frequency placed upon the control voltage input lines 202 and 204. The MP 112 can be modified so that the subliminal control apparatus 101 also controls the gain of the amplifier 216 to subliminally control the volume of the output audio signal, perhaps to subliminally alter the intensity of the exercise. The voltage/frequency on lines 202 and 204 can be switched to either the DM 206, or the amplifier 216, or both, to control tempo, volume, or both. The drive voltages on lines 202 and 204 are supplied by the TCU 110.

The operation of the TCU 110 will now be described with reference to FIGS. 3 and 4. The graph in FIG. 3 represents a sample audio-exercise routine of a long distance jogger in the form of drive motor voltage Vm versus time t. It is assumed that during the audio program, the pace of the jogger is related to the tempo of the music. Recall that the level and/or frequency of the drive voltage Vm determines the speed of the DM 206 and hence the tempo and/or volume of the ultimate audio signal.

The Segments 1-7 in FIG. 3 represent distinct time periods in the exercise routine. During Segment 1, beginning at time $t_0$, the jogger has not yet begun his or her routine, and so there is not yet any music. This is reflected by a Vmo value of "0" during Segment 1. During Segment 2, lasting 10 minutes and beginning at time $t_1$, the music begins playing at its normal tempo. A subliminal increase in tempo is introduced during the long 60 minute interval of Segment 3, beginning at time $t_2$. As can be seen from the graph, the drive voltage Vm gradually increases until it is 1.5 times the normal or nominal level ($Vm_1$). Because the time period is so great, the gradual increase in tempo will be subliminal, and the jogger will be running at an ever faster rate with no knowledge of the increase in the preferred embodiment, since the or she will try to keep his or her pace matched to the tempo of the music.

During Segment 4, which lasts 15 minutes beginning at time $t_3$, the jogger maintains his or her target rate reached at the end of Segment 3. Thus, the tempo remains constant during this segment in proportion to 1.5 Vm. Segment 5 is a "slow down" period lasting 15 minutes and beginning with time $t_4$, which allows the jogger to gradually return to the nominal jogging rate. Although Segment 5 only lasts 15 minutes, this is still long enough to introduce subliminal decreases to the tempo. Segment 6 is a "cool-down" period lasting 10 minutes and beginning at time $t_5$, to allow the body to cool-down before resting. During Segment 6 the tempo is at the nominal/starting level. During Segment 7, representing time $t_6$ and beyond, the music stops, and the jogger has finished his or her routine.

The drive motor voltage (or frequency) sequence shown in FIG. 3 is entered into the ICU 106 as a string of commands similar to those shown in TABLE 1, below.

TABLE I

| SEGMENT no. | START y/n | STOP y/n | AMP-I 0-2x | AMP-F 0-2x | PERIOD min. |
| --- | --- | --- | --- | --- | --- |
| 1 | n | n | 0 | 0 | 0 |
| 2 | y | n | 1 | 1 | 10 |
| 3 | y | n | 1 | 1.5 | 60 |
| 4 | y | n | 1.5 | 1.5 | 15 |
| 5 | y | n | 1.5 | 1 | 15 |
| 6 | y | n | 1 | 1 | 10 |
| 7 | n | y | 0 | 0 | 0 |

"SEGMENT" refers to the segment number in FIG. 3, "START" indicates whether the audio play-back unit is to start outputting music, "STOP" indicates whether the audio play-back unit is to stop outputting music, AMP-I represents the initial drive voltage amplitude as a multiple of the nominal voltage, where the nominal voltage is the voltage used to drive the drive motor at the normal operating speed, AMP-F represents the final drive voltage amplitude, and PERIOD represents the elapsed time of the entire sequence. The actual programming of a sequence will be detailed infra.

Figure 4:
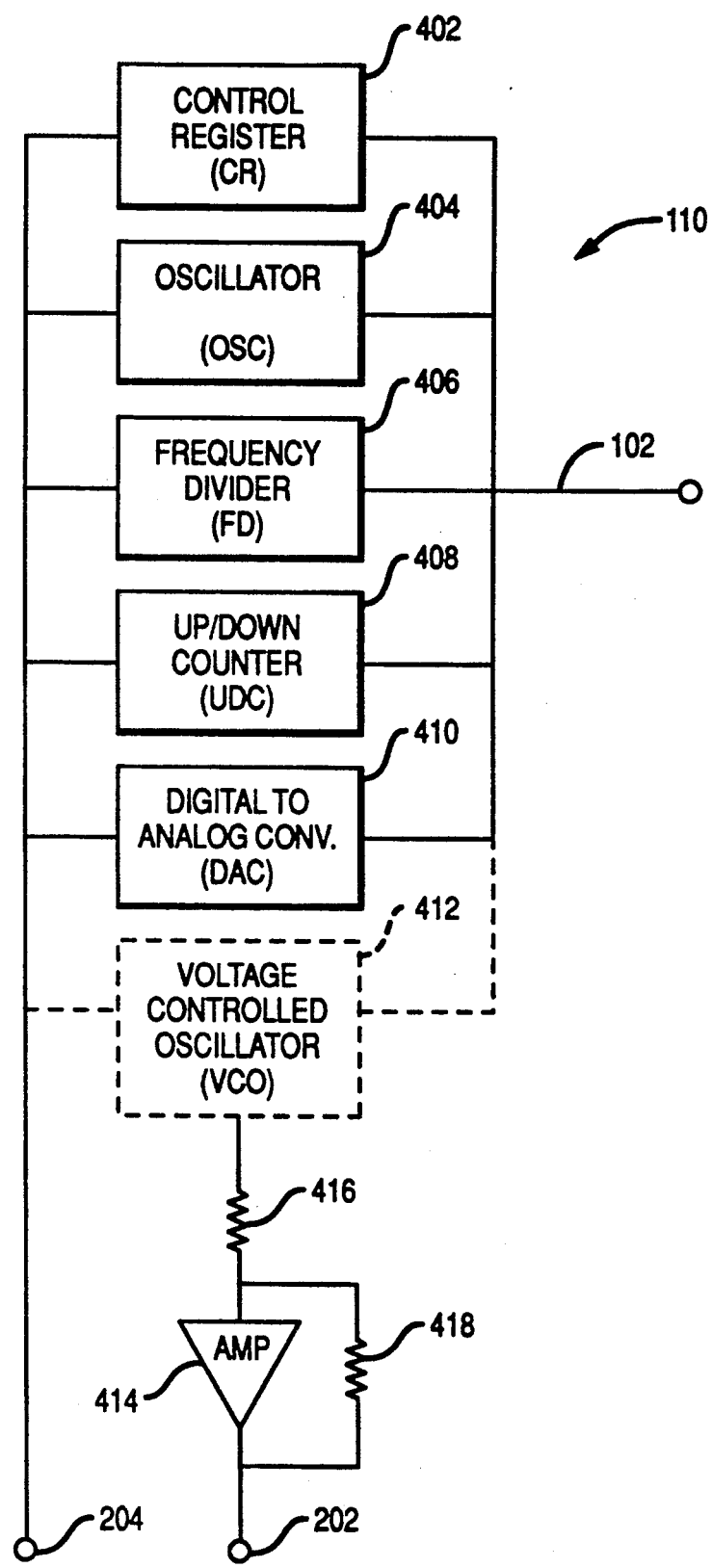
FIG. 4 is a schematic block diagram of the tempo control unit of the present invention.

Recall that the TCU 110, more fully detailed in FIG. 4, outputs the drive voltage Vm over output lines 202 and 204. A control register (CR) 402 stores CONTROL words and timing signals received from the PMU 108. An oscillator (OSC) 404 generates the pulses necessary for operation of an UP/DOWN counter (UDC) 408. The function of the OSC 404 can be performed by the Signetics Corp. NE556 Timer, for example. A programmable frequency divider (FD) 406 connected between the OSC and the UDC divides the frequency of the OSC in order to programmably change to the rate of adjustment of the UDC. The frequency divider made by National Semiconductor and identified by part no. F192 is adequate for this use.

The function of the previously-mentioned UDC 408 is performed by Texas Instruments part no. SN74HC193 in the preferred embodiment. In response to pulses from the FD 406 and program information from the CR 402, the UDC 408 outputs a digital word or count corresponding to a drive motor voltage. It will either increment the current count (when given the command "U" for "UP"), decrement the count (when given the command "D" for "DOWN"), maintain the count (when given the command "H" for "HOLD"), pre-set a pattern (when given the command "P" for "PRESET"), or reset to zero (when given the command "R").

A digital-to-analog converter (DAC) 410 converts the digital output words of the UDC 408, representing the current program used by the exerciser, into analog voltages. An optional voltage controlled oscillator (VCO) 412 would be used in the circuit of the TCU 110 in the case where the drive motor speed is related to the frequency of the drive motor voltage, such as with a brushless or synchronous motor. Otherwise, the DAC is directly connected to an amplifier 414 with input (416) and feedback (418) resistors, as is well known in the art. The amplifier 414 converts the voltage received from the DAC 410 to a level in the range of the operating voltages of the MP 112 (see FIG. 2). As previously stated the voltages output over lines 202 and 204 drive the DM 206 (see FIG. 2) at the appropriate speed, and are proportional to the tempo.

Figure 5:
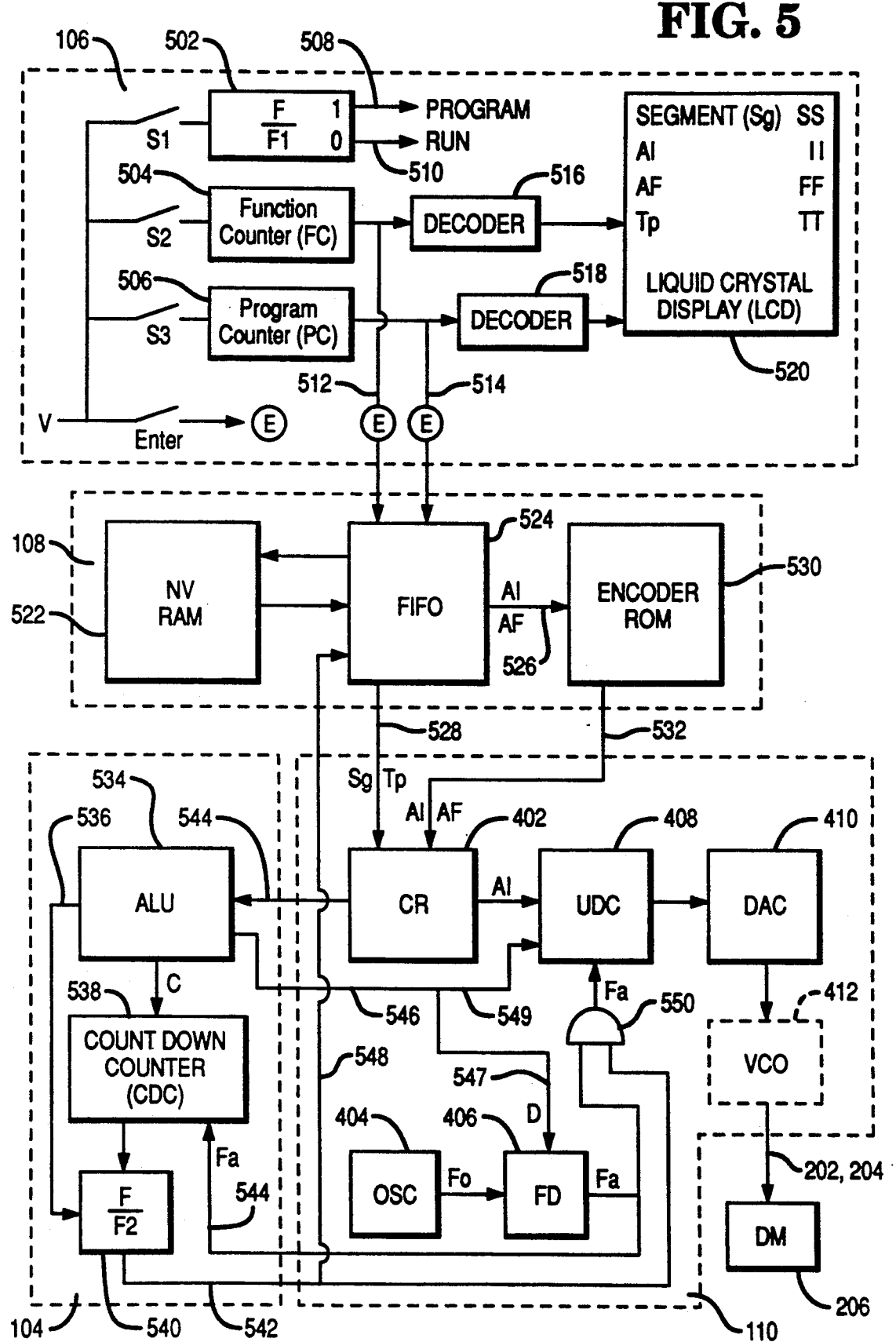
FIG. 5 is a schematic diagram of the input control, program memory, control and tempo control units of the present invention.

The details of programming an audio/exercise sequence will now be discussed, starting with the diagram in FIG. 5. The program is entered through the ICU 106, and is then stored in a first in, first out (FIFO) register 524 in the PMU 108. Four switches in the ICU 106 labeled S1, S2, S3 and ENTER are used to enter data into the FIFO 524, and onto a liquid crystal display (LCD) 520. Toggling the switch S1 places a flip-flop (F/F1) 502 in either a "PROGRAM" state enabling the user to program a sequence, or a "RUN" state enabling the program to be executed.

The switch S2 inputs a code representing the function currently being programmed to a four-state function counter (FC) 504. The four states are as follows: "0" represents the Segment Number (Sg); "1" represents the Initial Amplitude (AI); "2" represents the Final Amplitude (AF); and "3" represents the Segment Period (Tp). The switch S3 drives a sixty-four- state Program Counter (PC) 506 for storing a count representing the magnitude or numerical value corresponding to the function being programmed. Two decoders 516 and 518 decode the counts stored in the FC 504 and PC 506, respectively, and the decoded signals are displayed on the LCD 520 all during the programming of a sequence; that is, the parameter being programmed and its value. An ENTER switch is toggled each time a parameter is programmed, to send the parameter and its value to the FIFO 524 via lines 512 and 514, respectively. The LCD 520 also displays the program being run and other pertinent information when the audio motivation apparatus 100 is in the "RUN" mode. All entries into the FIFO 524 are also copied into a non-volatile RAM 522 for storage of the program and recall of the program at the user's convenience.

The following represents a procedure used to program an audio/exercise sequence having subliminal tempo variations:

Toggle S1 to place the audio motivation apparatus in the "PROGRAM" mode.

Toggle S2 until the LCD displays "Segment (Sg)".

Toggle ENTER.

Toggle S3 until the LCD displays the "Segment Number" to be programmed (0–15).

Toggle ENTER.

Toggle S2 until the LCD displays "Initial Amplitude (AI)".

Toggle ENTER.

Toggle S3 until the LCD displays the desired initial amplitude AI (0.1–2.0) as a ratio of the Nominal Amplitude, where Nominal has a numeric value of "1". (For example, 1.2 is 20% larger than Nominal, and 0.9 is only 90% of Nominal.)

Toggle ENTER.

Toggle S2 until the LCD displays "Final Amplitude (AF)".

Toggle ENTER.

Toggle S3 until the LCD displays the desired final amplitude (0.1–2.0) as a ratio of the Nominal Amplitude.

Toggle ENTER.

Toggle S2 until the LCD displays "Segment Period $(T_p)$".

Toggle ENTER.

Toggle S3 until the LCD displays the desired Segment Period $(T_p)$.

Toggle ENTER.

Continue the above routine until all of the desired Segments are programmed.

Each command and datum entered via switches S2 and S3 are stored in the FIFO 524 when the ENTER switch is toggled. FIG. 6a shows the arrangement of a FIFO word stored in the FIFO 524. Observe from that figure that a FIFO word is constructed as follows: 6 bits representing the Segment Period Tp, giving up to 64 possibilities (1–64 minutes); 5 bits representing the Final Amplitude, giving up to 32 possibilities (actually, only 20 distinct values are needed between 0.1 and 2.0 using 0.1 increments); 5 bits representing the Initial Amplitude; and 4 bits representing the Segment Sg, giving up to 16 possibilities (16 segments). The AI and AF bits in the FIFO word are converted into 12 bits each by an encoder ROM 530. The encoded AI and AF bits (24 total) are loaded via line 532 into the CR 402, as are the Sg and Tp bits from the FIFO via line 528. The AI, AF, Sg and Tp bits form a CONTROL word (see FIG. 6B) having 34 bits, which controls the operation of the TCU 110, and which CONTROL word remains in the CR 402 for the duration of the corresponding segment. The CR 402 inputs the AI, AF and Tp bits to an arithmetic logic unit (ALU) 534 of the CU 104 via line 544, and inputs the AI bits to the UDC 408.

Figure 8:
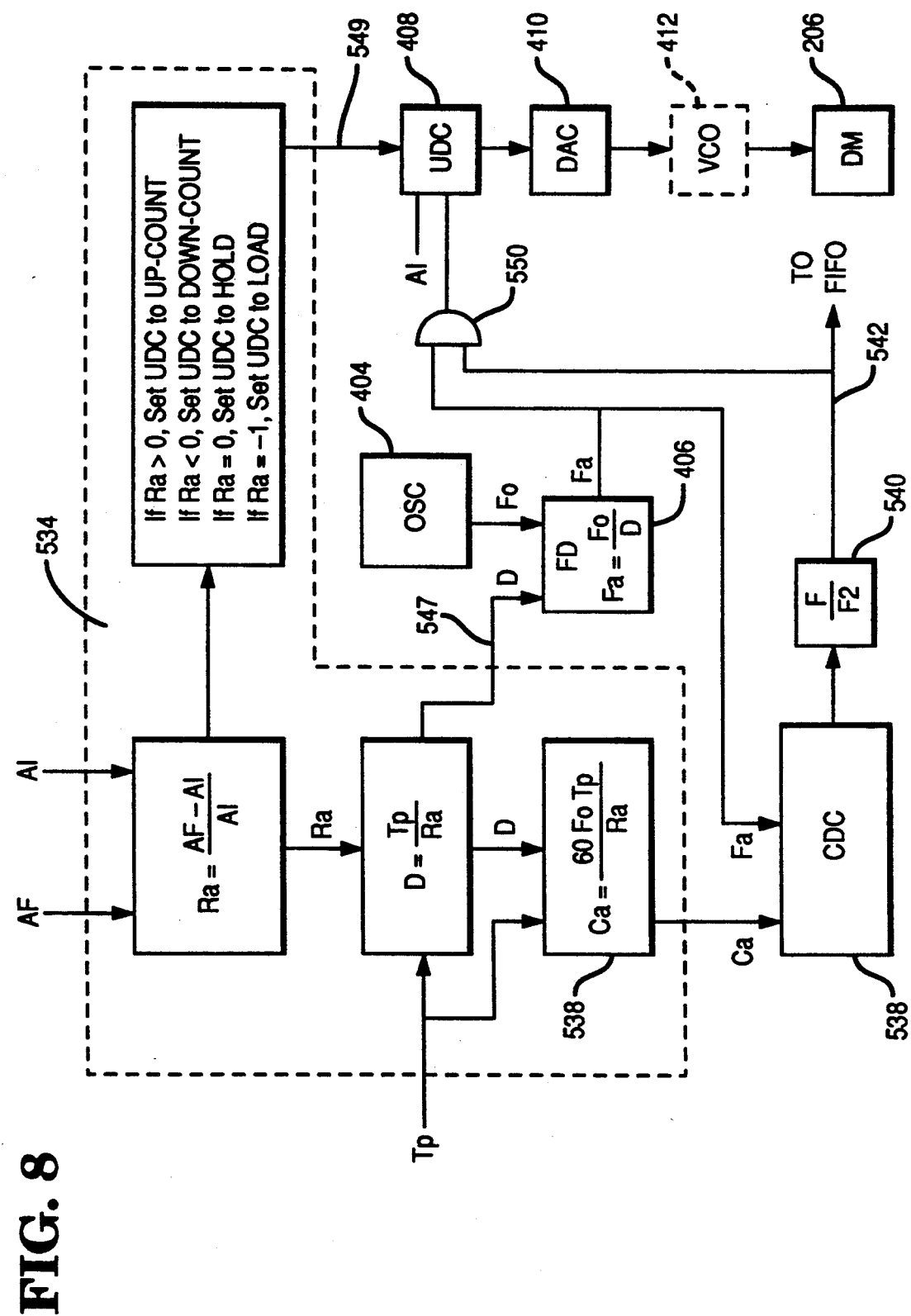
FIG. 8 is a simple schematic block diagram of the function of the arithmetic logic unit of the present invention.

The operation of the ALU will now be described, with reference to FIGS. 7 and 8. The ALU calculates the UDC mode control (Up, Down, Hold, Load) to be provided to the UDC 408 via lines 546 and 549, and the divisor D which is used to control the FD 406 via lines 546 and 547. FIG. 7 is a sample graph of a representative "ramp" voltage Vm versus time T. From the graph, it can be seen that the voltage ramp begins at voltage Va at time Ta and later increases to voltage Vb at time Tb.

Let Ra represent the ratio of the percentage change in Vm to the initial voltage, so that:

$$Ra = (Vb - Va)/Va \qquad (eq. 1)$$

and the period of time Tp (in minutes) elapsing during the change in Vm is $$Tp = (Tb - Ta) \qquad (eq. 2)$$

The frequency Of (in Hertz) needed for a 100% change in Va (where Vb=2Va) in one minute is $$Fo = 2^n/60 \qquad (eq. 3)$$

where n is the number of states of the UDC 408.

The preferred embodiment of the present invention normalizes time to one minute intervals while treating driver voltages as a percentage change of the initial voltage, so that the period Tp is stated in minutes. For correct operation, therefore, the frequency Of must be decreased by a factor equal to the number of minutes of the period Tp, and must be increased by the percent change in the voltage Ra during the period. Therefore, the Divisor D presented to the FD 406 is $$D = Tp/Rap \qquad (eq. 4)$$

Assuming, for example, that the UDC 408 is of the 12-bit variety, thus having 4096 states, Tp=6 minutes, and Ra=20%, then $$Fo = 4096/60 = 68.27 \text{ Hz} \qquad (eq. 5)$$

This is the frequency required to count through 4096 states in one minute. Thus, $$D = Tp/Ra = 6/0.2 = 30 \qquad (eq. 6)$$

$$Fa = Fo/D = 68.27/30 = 2.28 \text{ Hz} \quad (eq. 7)$$

where Fa is the UDC operation frequency. In this example, the UDC 408 is clocked at a frequency Fa of 2.28 Hz, and the ramp voltage moves 0.2 times the total count of the counter, while the DAC 410 increases the voltage output by the same percentage (20%). Alternatively stated, the UDC 408 sequentially inputs digital addresses to the DAC 410 at a rate of 2.28 Hz from the initial value representing Va to a final value Vb=1.2Va in a period of 6 minutes.

The contents of the flip-flop F/F1 502 (FIG. 5) are also available (although the connection is not shown) to the FIFO. The RUN state of the F/F1 502 causes the FIFO 524 to load the first Segment into the CR 402. The CR 402 then initiates the stored program selected. The ALU 534 calculates Ra, and sets the mode of the UDC 408 (see FIG. 8) according to the the value of Ra. The ALU 534 further calculates the divisor D for the frequency divider FD 406, and a Count Entry (Ca) to encode a Count-Down Counter (CDC) 538. The ALU 534 sets a second flip-flop F/F2 540 so that it (F/F2) enables an AND gate 550 (via line 542), causing Fa to be passed by the AND gate 550 to the UDC 408.

During the implementation of a Segment the CDC 538 sequentially counts down to zero, at which time F/F2 540 is reset (to 0), causing the UDC 408 to stop counting and causing the FIFO 524 (via line 548) to load the second Segment to be implemented. Each Segment is loaded and implemented until the last Segment in the program calls for a voltage amplitude of zero, which stops the program.

The audio motivation apparatus 100 can be made to manually interrupt an executing program by freezing the current output of the UDC 408, and causing D=1 and Fa=68.27 Hz. Then, the user may change the state of the UDC 408 manually to cause a change in tempo. Up to 4096 states can be counted in one minute, thus allowing for large tempo changes in a short period of time. Also, the user may manually switch to a new program, if desired.

Alternate Embodiment

It is desirous to practice the present invention when an exerciser does not have one of the above-described audio motivation apparatuses 100. In that case, a similar effect can be achieved by specially recording an audio tape or other audio storage device to include subliminal changes, and playing the tape on a constant-speed prior art audio play-back device. For example, during recording of the tape at a recording studio, the tempo of the music being recorded can be gradually increased so that the change is subliminal. This latter approach, however, is inferior to the preferred embodiment since the user is restricted to the pre-recorded changes, and does not have the ability to program any changes.

It is possible, however, to fuse a combination of the preferred and alternate embodiments which also provide the user with some programmability.

Variations and modifications to the present invention are possible given the above disclosure. However, all such variations and modifications are intended to be within the scope of the invention claimed by this letters patent. For example, the volume of a radio receiver can be subliminally increased or decreased either during physical activity as a motivation tool, or subliminally decreased during inactivity as a sleep aid. Additionally, the present invention need not be limited to a training tool, but can also be used while participating in an athletic event such as running a marathon race, or by disc jockeys to subliminally stimulate dancers.

We claim:

1. An audio signal reproduction apparatus for producing an output aural signal related to an input audio signal comprising:
   receiver means including audio play-back means for receiving said input audio signal and outputting a receiver output signal capable of allowing a user to correspond his activity thereto, which receiver output signal is a version of said input audio signal with altered identifiable characteristics; and
   control means coupled to said receiver means for programmably controlling, via control signals input by said user, at least a gradual alteration of said input audio signal over at least a portion of the duration of said input audio signal so that said alteration is subliminal.

2. The audio signal reproduction apparatus in claim 1 wherein said identifiable characteristics comprise tempo.

3. The audio signal reproduction apparatus in claim 1 wherein said identifiable characteristics comprise volume.

4. The audio signal reproduction apparatus in claim 1 wherein input audio signal is musical in nature.

5. The audio signal reproduction apparatus in claim 1 wherein input audio signal comprises cadence indicia.

6. The audio signal reproduction apparatus in claim 1 further comprising:
   program storage means coupled to said control means for storing said control signals in the form of one or more audio signal output programs.

7. The audio signal reproduction apparatus in claim 1 wherein said control means is a module removably coupled to said receiver means, and said audio reproduction apparatus functions without subliminal alternation of said input audio signal when said module is removed.

8. The audio signal reproduction apparatus in claim 2 wherein said input audio signal is received by said receiver means via a pre-recorded storage medium, and wherein said receiver means comprises:
   driver means for driving said receiver output signal, the speed of said driver means determining the tempo of said receiver output signal.

9. The audio signal reproduction apparatus in claim 8 wherein said control signals comprise voltages which are proportional to the speed of said driver means.

10. The audio signal reproduction apparatus in claim 8 wherein said control signals comprises frequencies which are proportional to the speed of said river means.

11. The audio signal reproduction apparatus in claim 1 wherein said control means is a module removably coupled to said receiver means, said audio reproduction apparatus functions without subliminal alteration of said input audio signal when said module is removed, said input audio signal is received by said receiver means via a pre-recorded storage medium, and wherein said receiver means comprises:
   driver means for driving said receiver outuput signal, the speed f said river means determining the tempo of said receiver output signal.

12. The audio signal reproduction apparatus in claim 1 wherein said control means further comprises manual override means for allowing said user to manually alter said input audio signal.

13. The audio signal reproduction method in claim 14 further comprising the step of:
   manually overriding said programmably controlling step to allow said user to manually alter said input audio signal.

14. An audio signal reproduction method for production an output aural signal related to an input audio signal comprising the steps of:
   receiving said input audio signal and outputting, via audio play-back means, a receiver output signal capable of allowing a user to correspond his activity thereto, which receiver output signal is a version of said input audio signal with altered identifiable characteristics; and
   programmably controlling, via control signals input by said user, at least a gradual alteration of said input audio signal over at least a portion of the duration of said input audio signal so that said laceration is subliminal.

15. The audio signal reproduction method in claim 14 wherein said identifiable characteristics comprise tempo.

16. The audio signal reproduction method in claim 14 wherein said identifiable characteristics comprise volume.

17. The audio signal reproduction method in claim 14 wherein input audio signal is musical in nature.

18. The audio signal reproduction method in claim 14 wherein input audio signal comprises cadence indicia.

19. The audio signal reproduction method in claim 14 further comprising the step of:

storing said control signals in the form of one or more audio signal output programs.

20. The audio signal reproduction method in claim 15 wherein said receiving step comprises the steps of:

receiving said input audio signal via a pre-recorded storage medium; and driving said receiver output signal, the speed of said driving determining the tempo of said receiver output signal.

21. The audio signal reproduction method in claim 20 wherein said said control signals comprise voltages which are proportional to the speed of said driving.

22. The audio signal reproduction method in claim 20 wherein said control signals comprise frequencies which are proportional to the speed of said driving.

* * * * *